United States Patent [19]

Lohr

[11] Patent Number: 4,642,153
[45] Date of Patent: Feb. 10, 1987

[54] METHOD AND APPARATUS FOR MAKING A SHEET OF MATERIAL

[75] Inventor: Thomas E. Lohr, Mount Clemens, Mich.

[73] Assignee: Allen Industries, Inc., Troy, Mich.

[21] Appl. No.: 677,433

[22] Filed: Dec. 3, 1984

Related U.S. Application Data

[63] Continuation of Ser. No. 499,604, May 31, 1983, abandoned.

[51] Int. Cl.⁴ ............................................. B30B 5/06
[52] U.S. Cl. .................................. 156/296; 156/311; 156/324; 156/381; 156/478; 156/583.5; 425/371
[58] Field of Search ............... 156/62.2, 62.4, 296, 156/311, 309.6, 324, 555, 498, 583.5, 583.1, 580, 381; 264/120, 121, 123, 126, 125, 122, 109; 425/83.1, 82.1, 364, 371, 373

[56] References Cited

U.S. PATENT DOCUMENTS 3,223,027 12/1965 Soda et al. .......................... 100/93
3,501,369 3/1970 Drelich et al. ...................... 264/126
3,942,929 3/1976 DeMets .............................. 425/371
4,334,468 6/1982 Güttinger et al. .................. 425/371

FOREIGN PATENT DOCUMENTS

0621950 4/1949 United Kingdom ............... 156/62.8

Primary Examiner—Michael Ball
Attorney, Agent, or Firm—Joseph V. Tassone

[57] ABSTRACT

A method and apparatus for making a sheet of material from a fiber textile-like mat is provided, the apparatus comprising a press having a pair of movable endless belts having adjacent runs adapted to receive a mat of fibers of thermoplastic material mixed with other fibers therebetween and having outer returning runs, the press having a compressing unit for compressing the mat between the adjacent runs of the belts to densify the mat, the press having a heating unit for heating the mat between the adjacent runs of the belts, and the press having a cooling unit for cooling the mat between the adjacent runs of the belts after the mat has been heated and densified by the heating unit and the compressing unit, the heating unit that heats the mat also preheating the outer runs of the belts before the mat is received between the adjacent runs of the belts.

18 Claims, 24 Drawing Figures

METHOD AND APPARATUS FOR MAKING A SHEET OF MATERIAL

CROSS REFERENCE TO RELATED APPLICATION

This application is a continuation patent application of its copending parent patent application, Ser. No. 499,604, filed May 31, 1983, now abandoned in favor of this continuation patent application.

BACKGROUND OF THE INVENTION

1. Field of the Invention

This invention relates to an improved method and apparatus for making a sheet of material from a fiber textilelike mat means formed of fiber means mixed with fibers of thermoplastic material.

2. Prior Art Statement

It is known in the art to provide a sheet of material having fiber means and thermoplastic means bonding the fiber means and the thermoplastic means together. For example, the thermoplastic means comprises a thermoplastic resin, such as polypropylene, and the fiber means comprises fibers of synthetic or natural origin, such as cellulose, fiberglass, etc., wherein the resulting sheet of material is densified under heat and pressure so as to be substantially flat while being adapted to be subsequently contoured or molded into a desired shape by heat and pressure. One such sheet of material is sold under the Trade name or Trademark "Azdel" by the Pittsburgh Plate Glass Company of Pittsburgh, Pa. and another such material is known as "Masonite."

It is believed that the apparatus for producing the aforementioned prior known sheets of material each comprises an arrangement wherein the fiber means and thermoplastic means are carried between adjacent runs of two endless belts that pass through a first section of the apparatus wherein the thermoplastic means and fiber means are heated and compressed between the adjacent runs of the belts and then pass through another section of the apparatus where the densified material is cooled so as to set the melted thermoplastic means to produce the substantially rigid sheet of material that exits from between the two belts. However, it is not known how the heating section of such an arrangement is provided or how the cooling section thereof is provided.

It is also believed that neither of these two prior known sheets of material are formed by having the thermoplastic means thereof initially in fiber form as required by this invention.

However, it is known to applicant to form the thermoplastic material in fiber form. For example, see the copending patent application, Ser. No. 499,605 filed May 31, 1983.

SUMMARY OF THE INVENTION

It is one feature of this invention to provide an improved method an apparatus for making a sheet of material having fiber means and thermoplastic means bonding the fiber means and the thermoplastic means together wherein the thermoplastic means comprise fibers of thermoplastic material.

In particular, it was found according to the teachings of the invention of the aforementioned co-pending patent application that the thermoplastic means can comprise fibers of thermoplastic material that can be mixed with the other fiber means to provide a fiber textile-like mat means that can be subject to heat and pressure to melt the thermoplastic fibers and densify the mat means so that upon subsequent cooling of the thermoplastic material in the mat means, the cooled thermoplastic material sets and thus causes the cooled densified mat means to be a substantially rigid sheet of material that can be subsequently reheated and deformed under pressure to provide a contoured sheet of material that has many uses, such as being utilized to form various components of a transportation vehicle as will be apparent hereinafter.

For example, it has been found according to the teachings of that invention that such fibers of thermoplastic material can comprise waste fibers of polypropylene and the other fiber means can comprise recycled textile fibers of synthetic or natural materials or combinations thereof and when mixed in a preferred ratio of between 55% to 65% polypropylene fibers and the remaining percent being the recycled fibers, such fibers can be readily formed into a flat moldable textile-like mat means by conventional textile equipment, such as garnett machines or airlay machines. Such fiber textile-like mat means can be subsequently placed in a press with heated platens where the platens compress the mat means to the desired thickness while the polypropylene fibers thereof melt and flow throughout the resulting densified sheet of material to bind all of the other fibers together so that when the densified sheet of material is subsequently cooled, the same can be removed from the press and be cut into rectangular sizes or other shapes as required for further processing thereof into final contoured products.

It was found according to the teachings of this invention that an improved method and apparatus can be provided for making the aforementioned sheet of material if movable belts are utilized in serial manner.

For example, one embodiment of this invention provides an apparatus for making a sheet of material from a fiber textile-like mat means of fiber means mixed with fibers of thermoplastic material and being subject to heat and pressure by press means to melt the thermoplastic fibers and densify the mat means so that upon subsequent cooling of the thermoplastic material in the densified mat means the cooled thermoplastic material sets and this causes the cooled densified mat means to be a substantially rigid sheet of material. The press means comprises a pair of movable endless belts having adjacent runs adapted to receive the mat means therebetween and having outer returning runs. The press means has compressing means for compressing the mat means between the adjacent runs of the belts to densify the mat means. The press means has heating means for heating the mat means between the adjacent runs of the belts. The press means has cooling means for cooling the mat means between the adjacent runs of the belts after the mat means has been heated and densified by the heating means and the compressing means. The heating means that heats the mat means also preheats the outer runs of the belts before the mat means is received between the adjacent runs of the belts. The apparatus has a chamber defining means substantially surrounding the outer and adjacent runs of the belts, the chamber defining means having two adjacent sections substantially separate from each other and through which the outer and adjacent runs of the belt serially move. One of the sections has the heating means therein and the other of the sections has the cooling means therein.

Accordingly, it is an object of this invention to provide an improved apparatus for making a sheet of material from a fiber textile-like mat means of fiber means mixed with fibers of thermoplastic material, the apparatus of this invention having one or more of the novel features of this invention as set forth above or hereinafter shown or described.

Another object of this invention is to provide an improved method for making a sheet of material from a fiber textile-like mat means of fiber means mixed with fibers of thermoplastic material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

While the various features of this invention are hereinafter illustrated and described as being particularly adapted to provide a sheet of material for forming contoured products for a transportation vehicle, it is to be understood that the various features of this invention can be utilized singly or in any combination thereof to provide sheets of material for other products as desired.

Therefore, this invention is not to be limited to only the embodiments illustrated in the drawings, because the drawings are merely utilized to illustrate some of the wide variety of uses of this invention.

Also, while it is preferred to utilize recycled and/or waste fibers of either natural or synthetic materials to form a sheet of material as hereinafter set forth because of the lower cost of such fibers, it is to be understood that some or all of the various fibers utilized to form the sheet of material can be virgin if desired.

As previously stated, it is a feature of this invention to provide an improved method and apparatus for making a sheet of material that is disclosed and claimed in the copending patent application, Ser. No. 499,605, filed May 31, 1983 and therefore it is believed that in order to fully understand the features of this invention, a full disclosure of the features of such co-pending patent application is desirable. Thus, FIGS. 1-22 comprise part of the subject matter of such co-pending patent application and will now be described.

Figure 1:
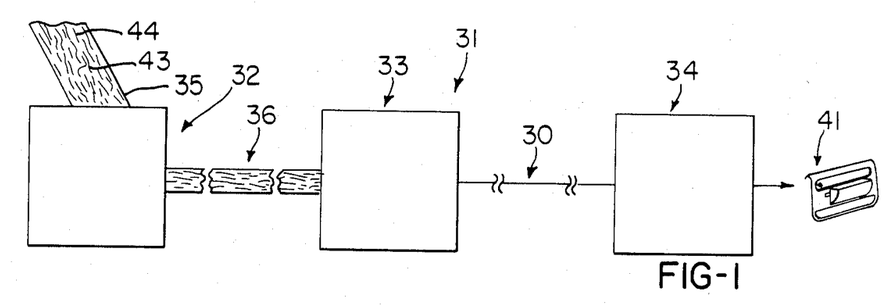
FIG. 1 is a schematic view illustrating a method and apparatus known to applicant for forming a sheet of material and subsequently reforming that sheet of material into a contoured product.
Figure 3:
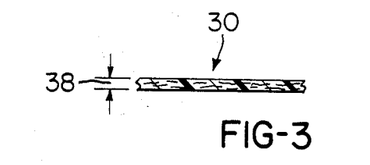
FIG. 3 is a fragmentary cross-sectional view of the improved sheet of material having been made by the method and apparatus of FIG. 1.

As illustrated in FIG. 1, the method and apparatus of co-pending patent application for forming a substantially flat rigid sheet of material that is generally indicated by the reference numeral 30 in FIG. 3 is generally indicated by the reference numeral 31 in FIG. 1 and comprises a fiber textile-like mat forming section 32, a heat and pressure mat densifying section 33 and a forming press section 34.

Figure 2:
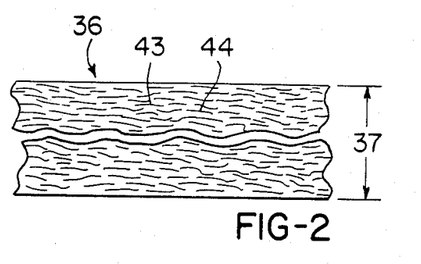
FIG. 2 is an enlarged fragmentary cross-sectional view of the fiber textile-like mat means being formed in the method and apparatus of FIG. 1.

While the fiber textile-like mat forming section 32 can comprise any suitable equipment for receiving a volume of blanded fibers as represented by the reference numeral 35 in FIG. 1 and forming the same into a relatively thick fiber textile-like mat means 36 as illustrated in FIGS. 1 and 2, the apparatus 32 can comprise conventional textile equipment, such as one or more garnetting machines or one or more airlay machines whereby the blended fibers 35 are layered or folded into the relatively thick fiber textile-like mat means 36 having a thickness represented by the reference numeral 37 in FIG. 2, such as between 12 and 18 inches thick. However, it is to be understood, that the fiber textile-like mat means 36 could have a thickness greater than 18 inches or be less than 12 inches as desired.

The method and apparatus 31 of FIG. 1 takes the fiber textile-like mat means 36 and through heat and pressure compresses and densifies the same in a manner hereinafter set forth to form the relatively flat sheet of material that is generally indicated by the reference numeral 30 in FIGS. 1 and 3 and having a thickness represented by the reference numeral 38 in FIG. 3, such as between 0.08 of an inch and 0.15 of an inch thick.

The densifying apparatus 33 can comprise a conventional heated press means wherein the fiber mat 36 is heated and compressed between opposed platens of the press to form the mat means 36 into the densified sheet means 30 of FIG. 3 in a manner hereinafter set forth and then permits the densified sheet means 30 to cool so that the same can be removed from the press in a substantially rigid sheet-like form.

However, it is believed that in order to produce such sheet means 30 in a continuous manner, the densifying section 33 can comprise the method and apparatus 39 of this invention illustrated schematically in FIGS. 23 and 24 and which will be hereinafter described.

Figure 4:
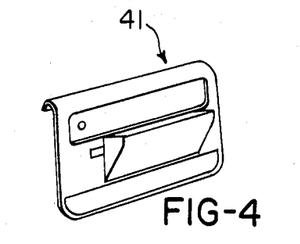
FIG. 4 is a perspective view of one example of a contoured product that can be formed from the sheet of material made by the method and apparatus of FIG. 1, the product of FIG. 4 comprising a door and quarter interior trim panel for a transportation vehicle made by a compression molding process.

In any event, it can be seen that the sheet of material 30 can be fed to a press forming section 34 to form a particular contoured product that is generally indicated by the reference numeral 41 in FIG. 1 and comprises a transportation vehicle trim panel that is best illustrated in FIG. 4. However, it is to be understood that the press section 34 can produce other contoured products, such as illustrated in FIGS. 5-20 as will be described hereinafter as well as entirely different products than products for the transportation vehicle field.

While any suitable press apparatus can be utilized for the forming press section 34 of the method and apparatus 31, one typical arrangement is generally indicated by the reference numeral 42 in FIGS. 21 and 22 and will be hereinafter described.

As previously stated, a plurality of fiber means 43 and fibers 44 of thermoplastic material are blended together in any suitable apparatus and fed by the supply means 35 to the fiber textile mat making means 32 to produce the fiber textile-like mat means 36 having the thickness 37 previously described. While the fibers 44 of thermoplastic material can comprise any suitable thermoplastic material as will be apparent hereinafter, it has been found that the same can comprise polypropylene and be either virgin or as waste fibers, such as from carpeting and the like, or various combinations thereof and be blended with the fiber means 43 which can comprise either virgin fibers or recycled fibers of any suitable natural or synthetic material or combinations thereof, such as recycled textile fibers known as "shoddy." As previously stated, the fibers 44 of thermoplastic material can comprise any suitable per cent of the total volume of fibers 44 and fiber means 43 and when the fibers 44 are polypropylene the same can comprise between 55% and 65% of the total volume. Also, when some of fiber means 43 comprises fibers of fiberglass, the fiberglass can comprise up to a total of approximately 20% of the volume of the fiber means 43.

In any event, the fiber textile-like mat means forming apparatus 32 causes the fiber means 43 and fibers 44 to be formed into the fiber textile-like mat means 36 which in the press 33 is formed into the sheet of material 30 by having the thermoplastic fibers 44 melted and densified with the fiber means 43 to produce the sheet 30 of the thickness of approximately 0.08 of an inch to approximately 0.15 of an inch thick.

The thus formed sheets 30 can be trimmed and cut to size to form substantially rectangular panels that can be fed to the press forming section 34 to form a contoured shape therefrom for a particular product.

Figure 21:
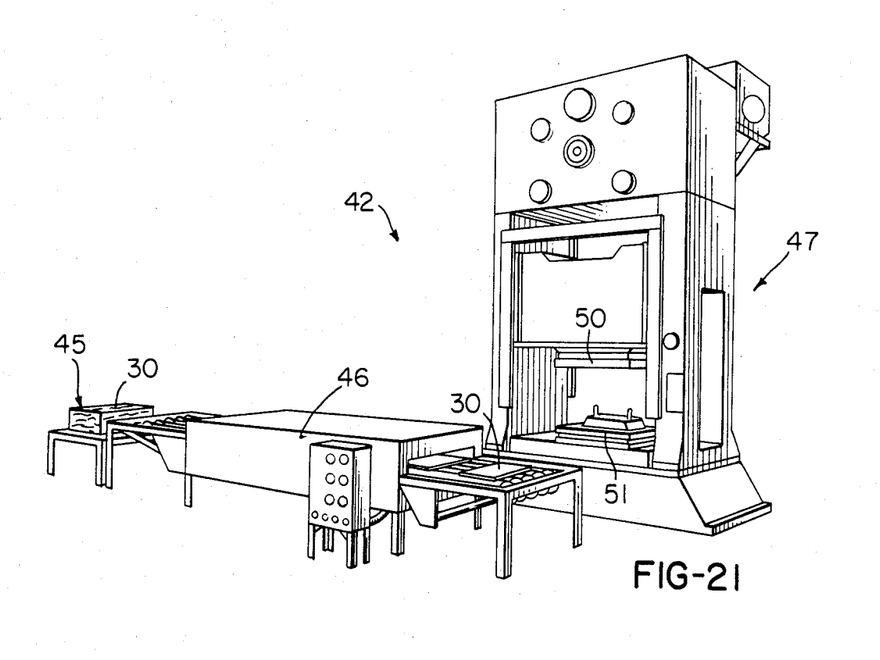
FIG. 21 is a perspective and schematic view illustrating a compression or flow molding press apparatus for forming the sheets of material illustrated in FIG. 3 into various contoured products, such as the contoured products as illustrated in FIGS. 4-20.
Figure 22:
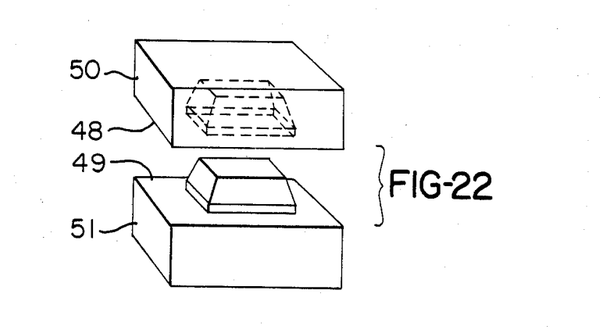
FIG. 22 is an exploded perspective view illustrating the two die members of the press of FIG. 21.

For example, reference is now made to FIGS. 21 and 22 wherein the press arrangement 42 comprises a stack 45 of sheets 30 which are each preheated in a heating oven 46 at a temperature which softens the sheets 30 but does not approach the melting point of the polypropylene thereof. For example, the oven 46 can heat the sheets 30 to approximately 425° F. and as the heated sheets 30 are serially discharged from the oven, each sheet 30 is placed in a press 47 between the die faces 48 and 49 of a pair of cooperating dies 50 and 51 thereof which are closed to shape the sheet 30 therebetween in a conventional manner.

For example, when the press 47 is to be utilized in a compression molding operation, the press can exert pressures between 200 to 500 psi and can have the dies 50 and 51 water cooled to a nominal temperature of approximately 100° F. to dissipate the residual heat from the hot plastic sheet 30. Cooling time in the closed die or press 47 necessary to cool the thus formed thermoplastic sheet 30 can vary from approximately 10 seconds to approximately 25 seconds at which time the completed part 41 is removed therefrom.

If desired, a trim operation can complete the molding phase of the part 41.

Should the press 47 be a flow molding press, the heated sheet 30 is compressed between the dies 50 and 51 under pressures of approximately 2,000 psi so that the material of the sheet 30 flows to fill the mold cavity provided between the dies 50 and 51 and thereby be shaped into the desired configuration for the final product 41. A cooling period of approximately 20 seconds to 30 seconds may be required before the part 41 can be removed from the dies 50 and 51, the dies 50 and 51 in the flow molding process also being water cooled to approximately 100° F. to dissipate the residual heat from the plastic sheet 30. With the flow molding process, and with proper die design, there should be little or possibly no flash to remove from the finished molded product 41.

Therefore, it can be seen that the method and apparatus 31 is adapted to produce a substantially flat thermoplastic sheet 30 of a given density or densities with the capability of thereafter being subject to post compression molding in a set of matched metal dies or to post flow molding under high pressure in a set of matched metal dies to form a desired product.

While it has been found that the final product is particularly adapted for the transportation industry, it is to be understood that there are other products from which the sheet 30 can be contoured to form a desired final product.

Nevertheless, it can readily be seen in FIG. 4 that one such product that the method and apparatus 31 can produce from the sheet of material 30 of FIG. 3 is a transportation vehicle interior trim panel 41 and the same can be formed by a compression molding process as previously set forth. Obviously, the trim panel 41 of FIG. 4 could be any formed foundation panel such as a door and quarter interior trim panel, as desired.

Figure 5:
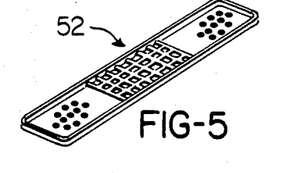
FIG. 5 is a perspective view of a transportation rear package tray made from the sheet of material of FIG. 3 by a compression or flow molding process.

As illustrated in FIG. 5, the product formed from the sheet of material 30 of FIG. 3 can comprise a transportation rear package tray 52 that can be formed from the sheet 30 of FIG. 3 by a compression or flow molding process as previously described.

Figure 6:
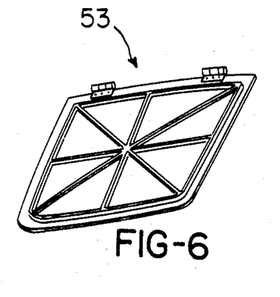
FIG. 6 is a perspective view of a rear hatch cover for a three-door transportation vehicle and made from the sheet of material of FIG. 3 by a compression or flow molding process.

As illustrated in FIG. 6, the sheet 30 of FIG. 3 can be formed by a compression or flow molding process as previously described into a rear hatch cover 53, such as for a three-door transportation vehicle.

Figure 7:
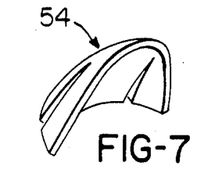
FIG. 7 is a perspective view of a transportation fender liner or splash shield made from the sheet of material of FIG. 3 by a compression molding process.

As illustrated in FIG. 7, the sheet of material 30 of FIG. 3 can be formed by a compression molding process into a fender liner or splash shield 54 for a transportation vehicle or the like.

Figure 8:
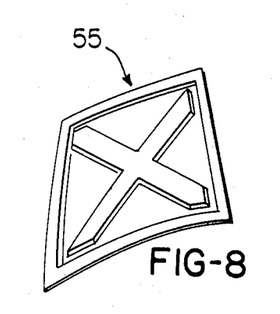
FIG. 8 is a perspective view of a transportation vehicle rear deck lid, lift gate or hood liner panel made from the sheet of material of FIG. 3 by a compression molding process.

As illustrated in FIG. 8, the sheet of material 30 of FIG. 3 can be formed by a compression molding process as previously described into a rear deck lid, lift gate or hood inner panel 55 for a transportation vehicle or the like.

Figure 9:
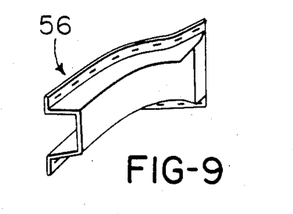
FIG. 9 is a perspective view of a transportation vehicle heater or air-conditioning duct work made from the sheet of material of FIG. 3 by a compression molding process.

As illustrated in FIG. 9, the sheet of material 30 of FIG. 3 can be formed by a compression molding process as previously described into a heating or air-conditioning duct work 56 for a transportation vehicle or the like.

Figure 10:
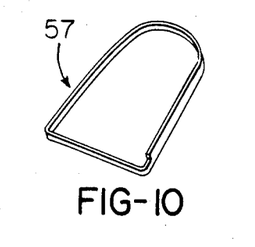
FIG. 10 is a perspective view of a transportation vehicle seat back foundation panel made from the sheet of material of FIG. 3 by a compression molding process.

As illustrated in FIG. 10, the sheet of material 30 of FIG. 3 can be formed by a compression molding process as previously described into a seat back foundation panel 57 for a transportation vehicle or the like.

Figure 11:
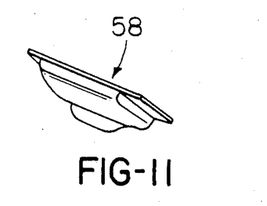
FIG. 11 is a perspective view of a transportation vehicle I.P. close-out cover made from the sheet of material of FIG. 3 by a compression or flow molding process.

As illustrated in FIG. 11, the sheet of material 30 of FIG. 3 can be formed by a compression or flow molding process as previously described into an I.P. closeout cover 58 for a transportation vehicle or the like.

Figure 12:
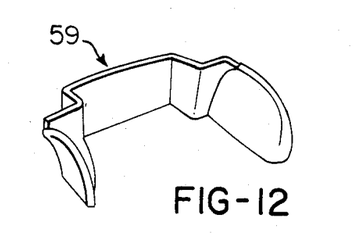
FIG. 12 is a perspective view of a transportation vehicle trunk liner made from the sheet of material of FIG. 3 by a compression molding process.

As illustrated in FIG. 12, the sheet of material 30 of FIG. 3 can be formed by a compression molding process as previously described into a trunk liner 59 for a transportation vehicle or the like.

Figure 13:
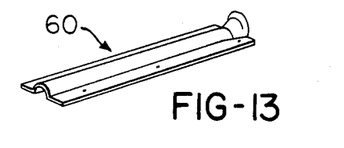
FIG. 13 is a perspective view of a transportation vehicle wiring harness protective cover made from the sheet of material of FIG. 3 by a compression molding process.

As illustrated in FIG. 13, the sheet of material 30 of FIG. 3 can be formed by a compression molding process as previously described into a wiring harness protective cover 60 for a transportation vehicle or the like.

Figure 14:
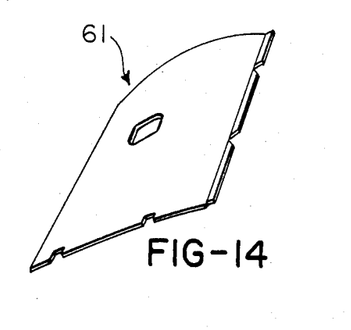
FIG. 14 is a perspective view of a transportation vehicle formed headliner foundation panel made from the sheet of material of FIG. 3 by a compression molding process.

As illustrated in FIG. 14, the sheet of material 30 of FIG. 3 can be formed by a compression molding process as previously described into a formed headliner foundation panel 61 for a transportation vehicle or the like.

Figure 15:
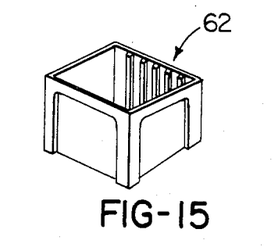
FIG. 15 is a perspective view of a transportation vehicle battery case made from the sheet of material of FIG. 3 by a flow molding process.

As illustrated in FIG. 15, the sheet of material 30 of FIG. 3 can be formed by a flow molding process as previously described into a battery case 62 for a transportation vehicle or the like.

Figure 16:
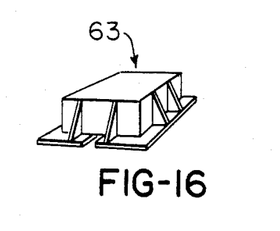
FIG. 16 is a perspective view of a transportation vehicle electrical component cover made from the sheet of material of FIG. 3 by a flow molding process.

As illustrated in FIG. 16, the sheet of material 30 of FIG. 3 can be formed by a flow molding process as previously described into an electrical component cover 63 for a transportation vehicle or the like.

Figure 17:
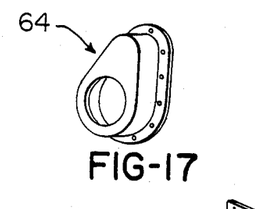
FIG. 17 is a perspective view of a transportation vehicle blower housing made from the sheet of material of FIG. 3 by a compression or flow molding process.

As illustrated in FIG. 17, the sheet of material 30 of FIG. 3 can be formed by a compression or flow molding process into a blower housing 64 for a transportation vehicle or the like.

Figure 18:
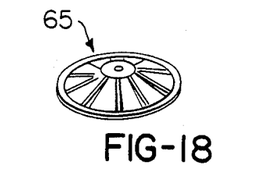
FIG. 18 is a perspective view of a transportation vehicle air cleaner cover made from the sheet of material of FIG. 3 by a compression or flow molding process.

As illustrated in FIG. 18, the sheet of material 30 of FIG. 3 can be formed by a compression or flow molding process as previously described into an air cleaner cover 65 for a transportation vehicle or the like.

Figure 19:
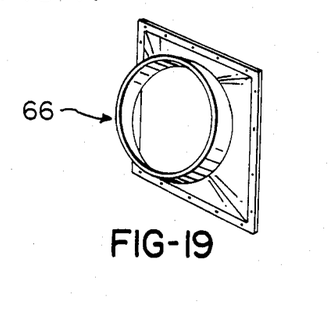
FIG. 19 is a perspective view of a transportation vehicle fan shroud made from the sheet of material of FIG. 3 by a compression molding process.

As illustrated in FIG. 19, the sheet of material 30 of FIG. 3 can be formed by a compression molding process as previously described into a fan shroud 66 for a transportation vehicle or the like.

Figure 20:
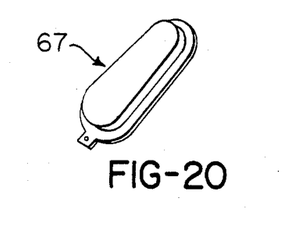
FIG. 20 is a perspective view of a transportation vehicle belt or chain guard made from the sheet of material of FIG. 3 by a compression or flow molding process.

As illustrated in FIG. 20, the sheet of material 30 of FIG. 3 can be formed by a compression or flow molding process as previously described into a belt or chain guard 67 for a transportation vehicle or the like.

Obviously, there are other products for a transportation vehicle that the sheet of material 30 can form by a compression or flow molding process as previously described, such as non-conductive housings, glove boxes, inner panels, etc.

Therefore, it is readily apparent that the press section 34 of the method and apparatus 31 can be utilized to form the sheet of material 30 into any desired contoured product whether for the transportation field or for other fields in the manner previously set forth for the method and apparatus 42 of FIGS. 21 and 22.

Thus, it can be seen that the invention of FIGS. 1-22 not only provides an improved sheet of material having fiber means and thermoplastic means bonding the fiber means and thermoplastic means together and a method of making the same, but also that invention provides an improved contoured sheet of such material wherein the contoured sheet of material comprises a shaped product.

For example, the method of that invention is adapted to make a sheet of material 30 having fiber means 43 and thermoplastic means 44 bonding the fiber means 43 and thermoplastic means 44 together, the method comprising the steps of forming the thermoplastic means 44 to comprise fibers 44 of thermoplastic material, mixing the fibers 44 with the fiber means 43 with means 32 to provide a fiber textile-like mat means 36, applying heat and pressure to the mat means 36 with means 33 to melt the thermoplastic fibers 44 and densify the mat means 36, and then cooling the thermoplastic material 44 in the densified mat means 30 so that the cooled thermoplastic material 44 sets and causes the cooled densified mat means 30 to be a substantially rigid sheet of material 30. Such sheet of material 30 can then be heated and shaped between a pair of dies by means 34 to produce a contoured sheet of material that comprises a desired shaped product.

In one example of that invention, the sheet of material 30 was formed from approximately 60% fibers 44 of polypropylene and approximately 40% textile fibers 43 with the resulting sheet 30 having a thickness of approximately 0.080 of an inch. Such sheet 30 had a flexural strength (ASTM D790) of approximately 6,619 psi and a tensile strength (ASTM D638) of approximately 4,621 psi with a stiffness at $\frac{1}{4}$ of an inch of approximately 1.50 lbs. and at $\frac{1}{2}$ of an inch of approximately 3.00 lbs., the sheet 30 having a specific gravity of approximately 0.94.

While the fibers 44 of thermoplastic material and fiber means 43 can be of any suitable length, the same can be anywhere from approximately $\frac{1}{2}$ inch to approximately 6 inches in length. However, it is to be understood that any desired length fiber means can be utilized.

Figure 23:
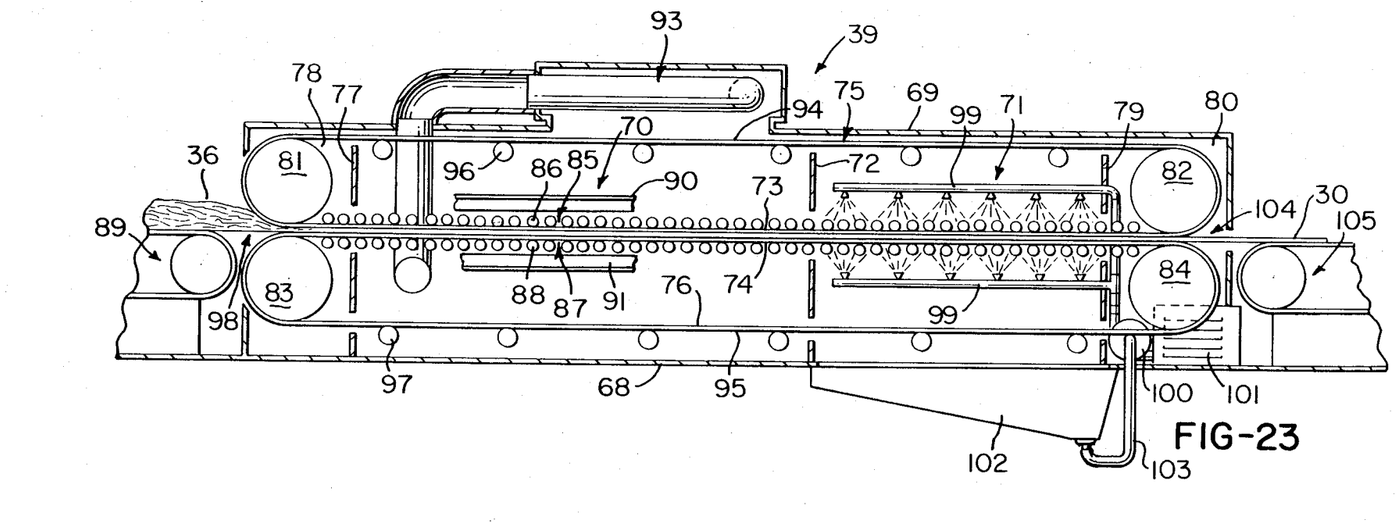
FIG. 23 is a schematic cross-sectional view of the method and apparatus of this invention for continuously forming the sheets of material of FIG. 3.
Figure 24:
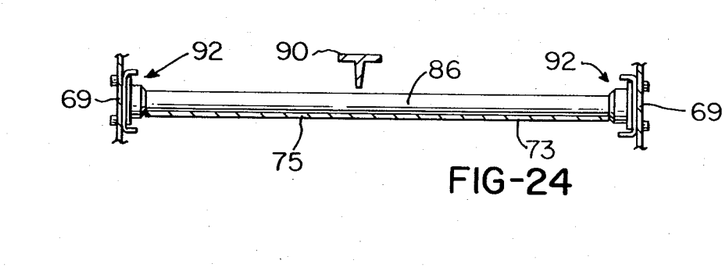
FIG. 24 is a fragmentary enlarged cross-sectional view of one of the roller means and a center support therefor of the apparatus of FIG. 23.

As previously stated, the densifying apparatus 33 of the method and apparatus 31 of FIG. 1 can comprise the method and apparatus 39 of this invention that is illustrated in FIGS. 23 and 24 and such method and apparatus 39 will now be described.

The method and apparatus 39 illustrated in FIGS. 23 and 24 comprise a frame means 68 carrying a chamber defining means 69 that has a heating section 70 and a cooling section 71 separated from each other by a wall means 72 through which a lower run 73 and an upper run 74 of a pair of continuous or endless belts 75 and 76 of metallic material can pass in parallel relation from left to right in FIG. 23, the left hand end of the heating chamber 70 also having a wall means 77 separating the chamber 70 from an in feed area 78 while the right hand end of the cooling chmber 71 has a wall means 79 that separates the cooling chamber 71 from an out feed area 80.

The belts 75 and 76 can each comprise a steel belt that is approximately 0.048 of an inch thick and approximately 70 inches wide, the belts 75 and 76 each having a length to accommodate the structure 69 as will be apparent hereinafter.

The upper belt 75 is fed around an in feed roller 81 and an out feed roller 82 while the lower belt 76 is disposed around an in feed roller 83 and an out feed roller 84 so that the runs 73 and 74 of the belts 75 and 76 are disposed substantially in parallel relation and respectively pass between an upper row 85 of a plurality of rollers 86 and a lower row 87 of a plurality of rollers 88 that tend to hold the belt runs 73 and 74 in parallel relation to each other and at a distance which will effectively and completely densify the fiber textile-like mat means 36 that is being fed in between the belts 75 and 76 by a feeding conveyor means that is generally indicated by the reference numeral 89 in FIG. 23.

While the chamber means 69 can have any suitable dimensions, it is believed that the same can have the heating section 70 thereof of approximately 50 feet in length and the cooling section 71 of approximately 30 feet in length whereby the number of rollers 86 and 88 could comprise approximately 900 rollers each having an outside diameter of approximately 1.9 inches, a length of approximately 70 inches and be spaced apart on approximately 2.4 inch centers.

In order to prevent deflection of the rollers 86 and 88 a central T-shaped support 90 can be disposed adjacent the medial portion of the upper row 85 of rollers 86 while a similar T-shaped support 91 will be disposed adjacent the medial portion of the lower set 87 of rollers 88 with approximately a 0.020 of an inch clearance therebetween to tend to prevent the respective rollers 86 and 88 from deflecting upwardly or downwardly under the pressure caused by compressing the mat means 36 between the runs 73 and 74 of the belts 75 and 76, such supports 90 and 91 at least being located in the heating section 70 of the apparatus 39.

Each roller 86 and 88 has its opposed ends respectively mounted in suitable bearing means 92 carried by the chamber defining means 69 of the frame means 68 as illustrated in FIG. 24.

The heating section 70 of the chamber defining means 69 can be heated with a gas fired heat exchanger blower system that is generally indicated by the reference numeral 93 in FIG. 23 and can be so arranged that the same will tend to preheat the upper run 94 of the upper belt 75 as well as the lower run 95 of the lower belt 76 as the same are brought back to the respective in feed rollers 81 and 83 from the cooling section 71, the upper run 94 of the upper belt 75 being supported by upper rollers 96 while the lower run 95 of the lower belt 76 is supported on lower rollers 97.

In this manner, the upper run 94 of the upper belt 75 and the lower run 95 of the lower belt 76 are suitably preheated so that by the time the same come together at the nip area 98 between the in feed rollers 81 and 83 as illustrated in FIG. 23, the belts 75 and 76 begin to melt the thermoplastic material in the fiber textile-like mat means 36 as the same is compressed between the in feed rollers 81 and 83, the runs 73 and 74 of the belts 75 and 76 maintaining a compressive force against the fiber textile-like means 36 in the heating section 70 so as to insure that substantially all of the thermoplastic material thereof is melted and compressed with the remaining fiber means 43 to form the substantially flat sheet 30 in a continuous manner by the time the sheet 30 exits the heating chamber 70 through the divider wall means 72.

When the sheet means 30 and belt means 75 and 76 reach the cooling chamber 71, the lower run 73 of the upper belt 94 and the upper run 74 of the lower belt 76 are respectively cooled by water spraying means 99 being fed by a pump 100, the water being cooled by a chiller 101 in a manner conventional in the art.

The cooling chamber 71 has a suitable reservoir chamber 102 for receiving the water has been utilized to chill the belts 75 and 76 so as to return to the pump 100 through a connecting pipe 103.

In this manner, the heating chamber 70 of the apparatus 39 can produce a temperature of approximately 420° F. which will be sufficient to cause the polypropylene fibers 44 to melt and fuse with the other fiber particles 43 into a homogeneous blended material or sheet 30 while the cooling section 71 can "chill" or reduce the temperature of the belts 75 and 76, as well as the material 30 therebetween, to approximately 130° F. maximum so that the chilling "gels" the thermoplastic material of the sheet 30 to set the same and enable it to "release" from the steel belts 75 and 76 so as to pass out of the nip means 104 of the exit roller means 82 and 84 as illustrated in FIG. 23 to be fed on a suitable conveyor means 104 to any desired area, such as to a suitable apparatus that will through edge shears and the like fix the finish width of the sheet with the sheet subsequently being passed through squaring shears where it can be cut into the desired lengths.

Therefore, it can be seen that in the operation of the apparatus 39 illustrated in FIG. 23, the belts 75 and 76 can be driven continuously by the entrance rollers 81 and 83 and exit rollers 82 and 84 so that the runs 73 and 74 thereof move substantially in unison from left to right and carry the fiber textile-like mat means 36 therebetween which is compressed by the entrance rollers means 81 and 83 and backup rollers 86 and 88 in such a manner that in the heating section 70 of the apparatus 39, the fibers 44 of thermoplastic material are sufficiently melted and the fiber mat 36 is sufficiently densified so that the thickness thereof is reduced to the desired thickness for the resulting sheet 30 which will be chilled in the cooling section 71 to a temperature thereof that causes the thermoplastic material to set and also permit the resulting sheet to release from the belts 75 and 76 so that the same can pass onto the conveyor means 105 for further processing thereof as previously set forth.

Therefore, it can be seen that this invention provides an improved method and apparatus for making a sheet of material.

While the form and method of this invention now preferred have been illustrated and described as required by the Patent Statute, it is to be understood that other forms and method steps can be utilized and still fall within the scope of the appended claims.

What is claimed is:

1. In a method for making a sheet of material from a fiber textile-like mat means of fiber means mixed with fibers of thermoplastic material and being subject to heat and pressure by press means to melt said thermoplastic fibers and densify said mat means so that upon subsequent cooling of said thermoplastic material in said densified mat means said cooled thermoplastic material sets and thus causes said cooled densified mat means to be a substantially rigid sheet of material, said method comprising the steps of forming said press means to comprise a pair of movable endless belts having adjacent runs adapted to receive said mat means therebetween and having outer returning runs, compressing said mat means between said adjacent runs of said belts with compressing means of said press means to densify said mat means, heating said mat means between said adjacent runs of said belts with heating means of said press means, and cooling said mat means between said adjacent runs of said belts with cooling means of said press means after said mat means has been heated and densified by said heating means and said compressing means, the improvement comprising the steps of also preheating said outer runs of said belts with said heating means that heats said mat means before said mat means is received between said adjacent runs of said belts, disposing a chamber defining means to substantially surround said outer runs and said adjacent runs of said belts, forming said chamber defining means to have two adjacent sections substantially separate from each other and through which said outer runs and said adjacent runs of said belts serially move, forming one of said sections to have said heating means therein, and forming the other of said sections to have said cooling means therein.

2. A method as set forth in claim 1 and including the step of forming each said belt to comprise an endless belt of metallic material.

3. A method as set forth in claim 2 and including the step of forming said compressing means to comprise a plurality of rollers engaging said belts on the sides of said adjacent runs thereof opposite to the sides thereof that engage said mat means.

4. A method as set forth in claim 2 and including the step of forming said heater means to comprise means for creating heated air in said one section to act on said mat means and on said outer runs and said adjacent runs of said belts.

5. A method as set forth in claim 2 and including the step of forming said cooling means to comprise means for cooling said adjacent runs of said belts.

6. A method as set forth in claim 5 wherein said step of cooling said adjacent runs of said belts comprises the steps of spraying cooled water on said adjacent runs of said belts with said cooling means.

7. A method as set forth in claim 6 wherein said step of spraying cooled water comprises the step of spraying said water on the sides of said adjacent runs opposite to the sides thereof that engage said mat means.

8. A method as set forth in claim 1 and including the steps of forming said compressing means to comprise a plurality of rollers engaging said belts on the sides of said adjacent runs thereof opposite to the sides thereof that engage said mat means, and disposing said rollers in said two adjacent sections.

9. A method as set forth in claim 8 and including the steps of forming said heating means to include means for creating heated air in said one section, and forming said cooling means to include means for spraying cooled water on said belts in said other section.

10. In an apparatus for making a sheet of material from a fiber textile-like mat means of fiber means mixed with fibers of thermoplastic material and being subject to heat and pressure by press means to melt said thermoplastic fibers and densify said mat means so that upon subsequent cooling of said thermoplastic material in said densified mat means said cooled thermoplastic material sets and thus causes said cooled densified mat means to be a substantially rigid sheet of material, said press means comprising a pair of movable endless belts having adjacent runs adapted to receive said mat means therebetween and having outer returning runs, said press means having compressing means for compressing said mat means between said adjacent runs of said belts to densify said mat means, said press means having heating means for heating said mat means between said adjacent runs of said belts, said press means having cooling means for cooling said mat means between said adjacent runs of said belts after said mat means has been heated and densified by said heating means and said compressing means, the improvement wherein said heating means that heats said mat means also preheats said outer runs of said belts before said mat means is received between said adjacent runs of said belts, said apparatus having a chamber defining means substantially surrounding said outer runs and said adjacent runs of said belts, said chamber defining means having two adjacent sections substantially separated from each other and through which said outer runs and said adjacent runs of said belts serially move, one of said sections having said heating means therein and the other of said sections having said cooling means therein.

11. An apparatus as set forth in claim 10 wherein each said belt comprises an endless belt of metallic material.

12. An apparatus as set forth in claim 11 wherein said compressing means comprises a plurality of rollers engaging said belts on the sides of said adjacent runs thereof opposite to the sides thereof that engage said mat means.

13. An apparatus as set forth in claim 11 wherein said heating means comprises means for creating heated air in said one section to act on said mat means and on said outer runs and said adjacent runs of said belts.

14. An apparatus as set forth in claim 11 wherein said cooling means comprises means for cooling said adjacent runs of said belts.

15. An apparatus as set forth in claim 14 wherein said means for cooling said adjacent runs of said belts comprises means for spraying cooled water on said adjacent runs of said belts.

16. An apparatus as set forth in claim 15 wherein said means for spraying cooled water is adapted to spray said water on the sides of said adjacent runs opposite to the sides thereof that engage said mat means.

17. An apparatus as set forth in claim 10 wherein said compressing means comprises a plurality of rollers engaging said belts on the sides of said adjacent runs thereof opposite to the sides thereof that engage said mat means, said rollers being disposed in said two adjacent sections.

18. An apparatus as set forth in claim 17 wherein said heating means includes means for creating heated air in said one section and wherein said cooling means includes means for spraying cooled water on said belts in said other section.

* * * * *